Aug. 8, 1967 S. P. WILLITS 3,335,281
SYMMETRICALLY SATURATED POSITION SERVO CONTROL WITH
DUAL AMPLITUDE OPTICAL OFFSET SCANNING
Filed Sept. 24, 1963 4 Sheets-Sheet 1

SAM'L. P. WILLITS INVENTOR
BY Jacque L. Meister
AGENT

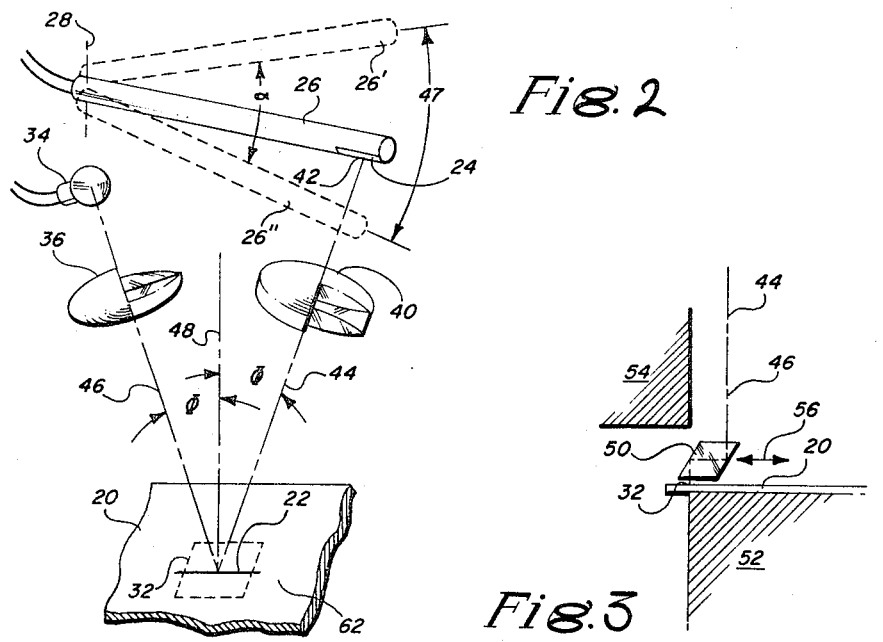
Fig. 2
Fig. 3
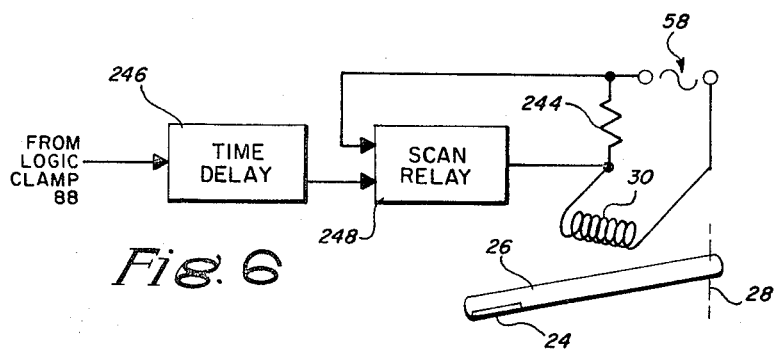
Fig. 6
Fig. 8
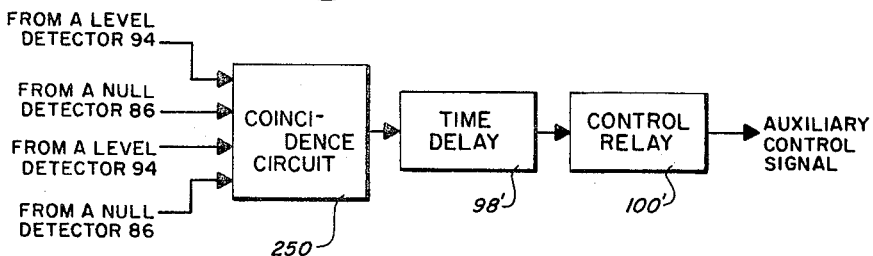

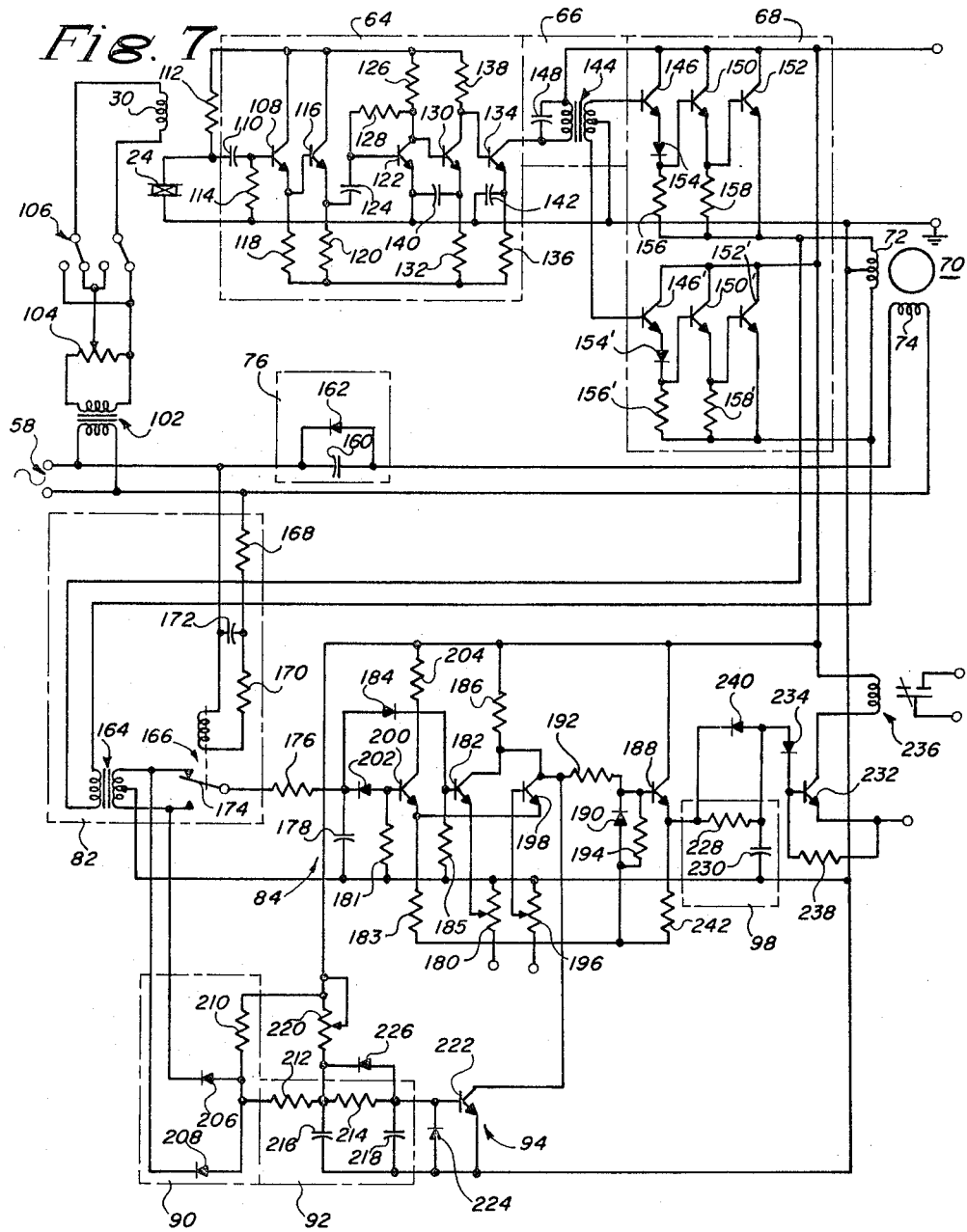

United States Patent Office 3,335,281
Patented Aug. 8, 1967

3,335,281
SYMMETRICALLY SATURATED POSITION SERVO CONTROL WITH DUAL AMPLITUDE OPTICAL OFFSET SCANNING
Samuel P. Willits, Barrington, Ill., assignor to Spartanics Ltd., Barrington, Ill., a corporation of Wisconsin
Filed Sept. 24, 1963, Ser. No. 311,094
16 Claims. (Cl. 250—202)

My invention generally relates to improvements in apparatus for automatically positioning registration marks and, more particularly, to an electro-optical sensing apparatus having outputs useful for positioning the apparatus or elements associated therewith relative to the registration marks and for initiating further action when positioning has been completed.

Many manufacturing processes require the accurate positioning of registration marks or some other suitable indicia inscribed on a work piece relative to some reference position. Depending upon the location of the reference position, this positioning can be generally divided into two different types. In the first type, the reference position is established by a mechanical parameter such as a locating or cutting surface. In the second type, the reference position is established by the location of other indicia bearing work pieces.

An example of the first type of reference position location occurs in the nameplate industry. There, a frequent requirement exists for the shearing of pre-printed sheet stock along shear lines or some other visible indicia printed simultaneously with the pre-printing on the sheet. An example of the second type of reference position location occurs in multi-color printing operations where color registration marks are commonly employed. However, both of these types of reference position location ordinarily share a common problem. That common problem is the requirement for human intervention in manually and visually positioning the indicia bearing work piece relative to the reference position. Depending upon the positioning accuracies required and the particular process involved, this positioning is normally achieved quite slowly and requires a skilled operator. Additionally, the percentage of rejected material caused by insufficiently accurate positioning can be quite large even with a skilled operator. Another disadvantage of manual-visual positioning of registration indicia becomes apparent when the possibilities of variation and error present in operations requiring human judgment are considered relative to handling in subsequent operations.

Accordingly, and with the foregoing comments in mind, a principal object of my invention is to provide apparatus for eliminating the need for human judgment in the alignment of registration indicia.

Another object of my invention is to provide an improved and novel electro-optical sensing apparatus which senses the position of registration indicia relative to itself and provides an output signal representative thereof to indicate or control the position of the indicia.

Still another object of my invention is to provide new and improved electro-optical sensing apparatus which automatically determines and adjusts its scan amplitude in accord with the position error of the registration indicia.

Yet another object of my invention is to provide improved and novel electro-optical sensing apparatus capable of providing an output control signal to associated machinery when alignment of the registration indicia has been satisfactorily accomplished.

A special object of my invention is the provision of an offset-optical path in electro-optical sensing apparatus.

The foregoing and other objects of my invention are realized in my sensing apparatus by a novel electro-optical sensing head which produces electrical signals having characteristics related to the relative position of some registration mark or indicia. The electrical signal output of the sensing head is amplified and filtered to provide a control signal for a servo positioning device which mechanically repositions the registration indicia into a selected alignment with the electro-optical sensing head. Electronic logic and demodulation techniques are employed to analyze the control signal from the electro-optical sensing head and to generate an auxiliary control signal when the registration indicia has been correctly positioned relative to a selected reference position. Additional circuit elements automatically adjust scan amplitude selecting a large amplitude when the position error of the registration indicia is large and a smaller amplitude when the position error is small. Because the error sensing transducer of my invention is required to operate over a sensitivity range that normally precludes stable servo operation, there are provided novel means for stabilizing the operation of any associated servo positioning device.

The nature of my invention and its many features and objects will appear more fully from the following description made in connection with the accompanying drawings wherein like reference characters refer to the same or similar parts throughout the several views and in which:

FIGURE 2 is a mechanical schematic in perspective of my electro-optical sensing head and its relationship to the indicia bearing workpiece;

FIGURE 3 is a partial mechanical-optical schematic of an embodiment of my sensing head showing my method of achieving an offset optical path;

FIGURE 6 is an electrical schematic in partial block diagram form illustrating the circuitry which monitors registration indicia position and correspondingly adjusts scanning amplitude in the electro-optical sensing head;

FIGURE 7 is a detailed electrical schematic of a selected portion of the circuitry of the invention; and FIGURE 8 is a schematic illustrating in block diagram form circuit elements employed in a multi-channel embodiment of the invention.

Figure 1:
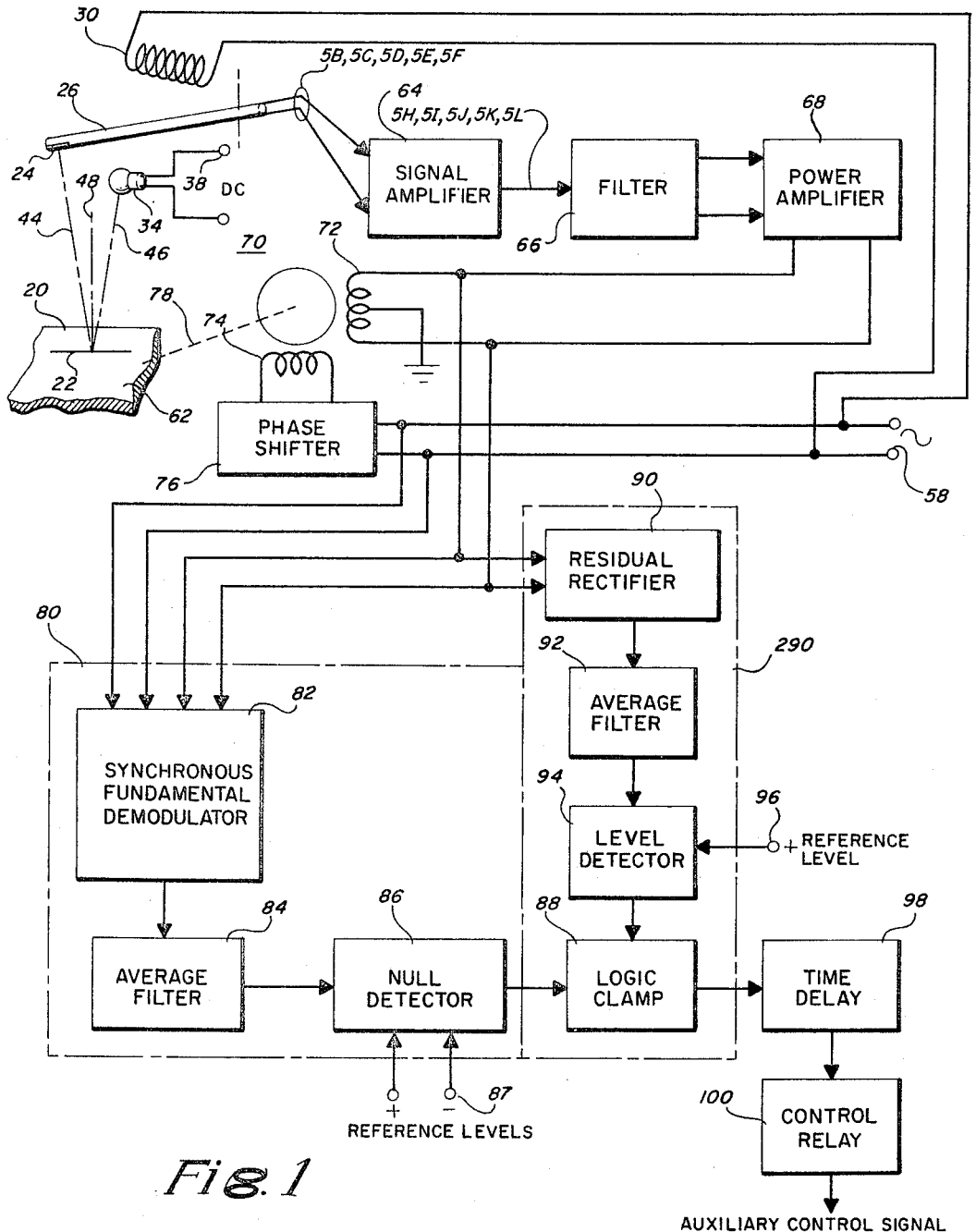
FIGURE 1 is a combination mechanical schematic-electrical block diagram of the principal elements of my sensing apparatus.

Referring now to the drawings and FIGURES 1 and 2 in particular. FIGURE 1 illustrates in schematic form the principal components of an illustrative embodiment of my invention and FIGURE 2 shows in greater detail the optical path employed in my scanning head. There, material 20, bearing a suitable registration mark or other indicia 22 is positioned to be optically aligned with a photo-detector 24 mounted in an oscillating arm 26. Arm 26 is oscillated about pivot axis 28 between two fixed positions indicated in phantom outline at 26' and 26" by a conventional moving coil type of electro-mechanical drive schematically indicated by arm drive coil 30. Coil 30 is excited by an AC reference signal applied to the circuitry at terminal 58. The combination of oscillation and physical size of the active area of detector 24 results in a scanned area indicated at 32.

A light source 34 is focused by condensing lens 36 on scanned area 32 to provide illumination for detector 24. Suitable aperture stops (not illustrated) may be used in some instances to restrict the light from source 34 to scan area 32 or nearly so although such stops are not essential to the invention. The only requirement in this regard is the prevention of direct irradiation of detector 24 by source 34. Light source 34 is excited by a DC source 38 to insure no AC signal components will be generated by detector 24 by any rapid variations in intensity of the source. Use of such a DC excited light source has proven advantageous as will become apparent later in this description.

An image of the active scanning area 32 is formed by objective lens 40 in or substantially in the plane of movement of oscillating arm 26 and specifically in the plane of an aperture mask 42 positioned on that arm in front of detector 24. To provide an enhanced signal amplitude and an averaging effect to overcome any problem created by any variations in line width or smoothness, the shape of the aperture in mask 42 has been made long and narrow with the major axis of the aperture positioned parallel to the axis of scan arm 26. Detector 24 is positioned relative to the aperture in mask 42 so that only light passing through the aperture from lens 40 can fall on the detector's sensitive surface. In this manner the aperture in mask 42 defines the active area of detector 24. In the majority of embodiments constructed, the detector employed has been a silicon photovoltaic cell. This particular type of cell was chosen for its small size, logarithmic saturation characteristics and low impedance which matches the transistorized signal processing circuitry employed. Obviously, however, other types of cells may be employed depending on operating parameters.

In operation oscillating arm 26 oscillates through a small angle $\alpha$ about axis 28 in a plane perpendicular to the optical axis 44 of lens 40. While the absolute scan amplitude 47 plus the width of the aperture in mask 42 is necessarily greater than the imaged width of registration mark 22, the showing of FIGURE 2 has been exaggerated for illustration purposes. More nearly to scale is the illustration of FIGURE 4 discussed further below. The elements of the scanning head are so arranged that this oscillation of arm 26 periodically translates aperture mask 42 and detector 24 across the image of active sensing area 32 in a direction substantially perpendicular to the long axis of the image of registration mark 22. Thus, at any instant, the light falling on detector 24 through the aperture in mask 42 is a measure of the brightness of the particular part of the image of the active sensing area visible through the aperture in the mask. The resulting electrical output of detector 24 is thus proportional to the brightness of a particular part of the image of active sensing area 32 falling at any instant on the aperture in the mask 42.

Figure 4:
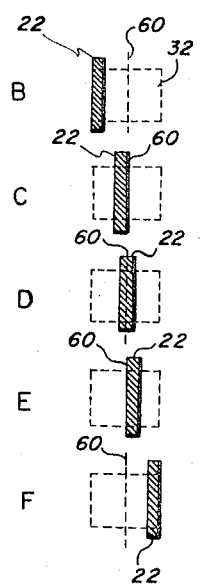
FIGURES 4B through 4F illustrate various positions of a registration mark sensed by the system relative to the active scanning area of the system.
Figure 5:
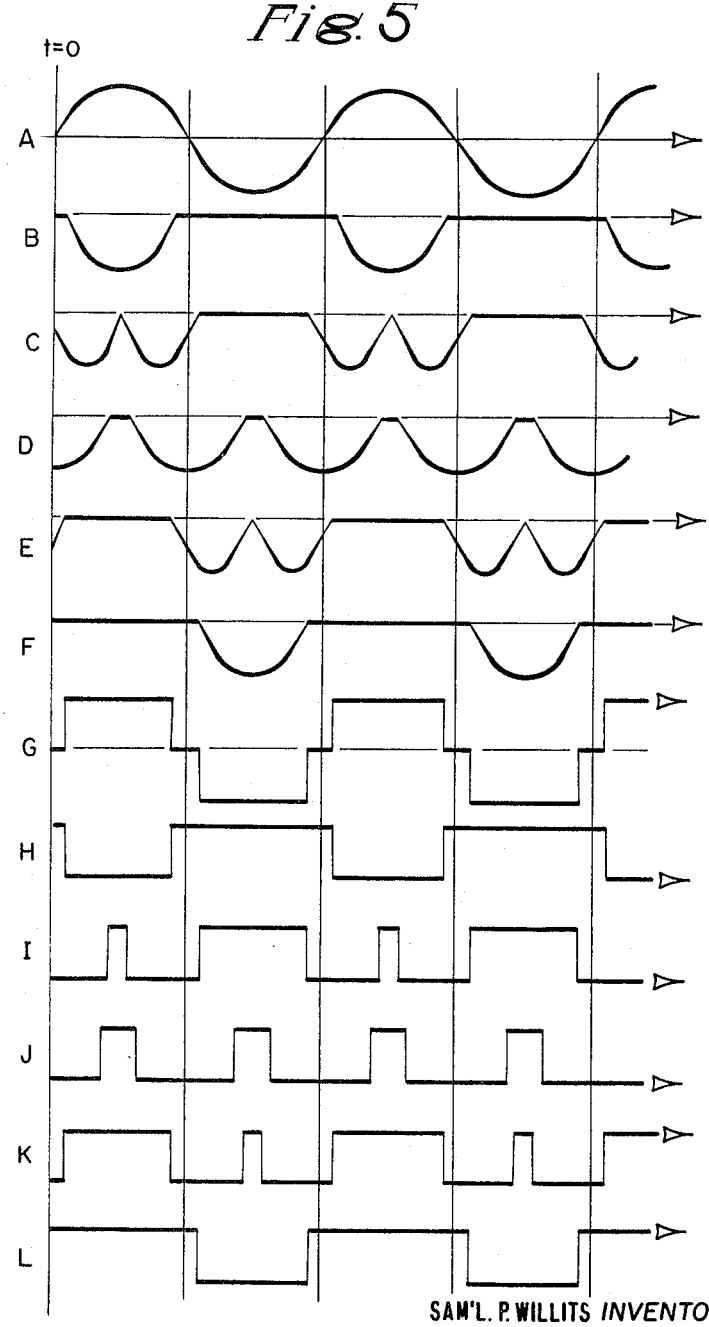
FIGURE 5 is a waveform diagram illustrating output waveforms from the inventive sensing head for the various positions of the registration indicia relative thereto illustrated in FIGURE 4 and of the waveforms appearing at various points in the circuitry of FIGURES 1 and 6.

The signal outputs of detector 24 for various positions of registration mark 22 relative thereto are discussed in conjunction with FIGURES 4 and 5. However, before continuing with a description of these signals and of my signal processing circuitry, a description and understanding of other characteristics of the scanning head of the invention will aid in understanding the detector signal outputs and processing circuitry.

In certain applications, the material 20 bearing the registration marks 22 has a highly polished surface. In such an instance, the specular reflections from the polished surface contain a very high percentage of the total light reflected from that surface. Additionally, depending on the angle of the optical axis 46 of lens 36 relative to the polished surface and the angle of optical axis 44 relative thereto, the image of the registration mark will appear either light or dark regardless of its absolute contrast relative thereto. Obviously this can present problems of signal polarity as the material 20 is positioned. To provide consistent polarity of the detector signal in the face of such a condition and to enhance signal levels and reduce spurious signals, it has been found desirable to have the optical system, including the surface of material 20 in optical alignment. I have found that this effect can be achieved by arranging optical axes 44 and 46 in such a manner as to cause them to intersect each other and a line 48 drawn perpendicular to the surface at or very near the surface of material 20, by having axes 44 and 46 and line 48 in the same plane, and by further arranging the axes 44 and 46 relative to line 48 so that the angles $\phi$ formed between each axis and that line are equal.

Another type of material variation that can affect the accuracy of scanner type sensing apparatus of the type employed in my invention, occurs when the distance from the sensing head to the registration mark varies. This distance variation most frequently is caused by material thickness changes and can result in positional errors of the work piece 20 relative to the desired reference position. It is an advantageous feature of my invention that these positional errors are eliminated by a particular geometrical arrangement of the entire illuminating, imaging and scanning system. The particular geometrical arrangement used operatively places these elements in a plane mutually perpendicular to both the scanning direction and the material being registered. Such an arrangement is shown in FIGURES 1 and 2.

In many applications of my automatic sensing apparatus, mechanical interference with machine elements physically prevents achieving the above set forth requirement for operating the active elements of the sensing head in a single plane which includes the registration mark. To overcome this difficulty and retain the advantages of operating the elements of the sensing head in a single plane, I provide an optical offset achieved by the insertion of a rhomboid prism into the optical system near or adjacent to the surface bearing the registration mark. This arrangement is illustrated in FIGURE 3 where rhomboid prism 50 is shown positioned adjacent active scanning area 32 and material 20 to provide the desired offset in optical axes 44 and 46 relative to fixed shear blade 52 and movable shear blade 54. As will be apparent to those versed in the optical arts, reflectors and other optical elements can be used to obtain optical offsets in place of the illustrated rhomboid prisms and such elements are employed when the optical path is modified to reduce its height. However, a special feature of a rhomboid prism is that optical systems employing such a prism are relatively insensitive to small positional changes of the prism relative to the sensing head.

In certain applications of my automatic sensing apparatus, some mechanical part or machine element, such as a shear blade, must be moved through the space occupied by the optical system of the invention. It is a special feature of the invention that such movements of machine elements can be effected without resultant damage to the optical system. This advantageous result is obtained by utilizing a wieldable rhomboid prism in the inventive optical system. Because of the properties of the rhomboid prism, the prism can be reciprocally displaced in the directions of double ended arrow 56 during the shear cycle and any small positional changes in prism location relative to the optical axes 44 and 46 that occur when the prism is returned to normal operating position after displacement do not result in any error in location of the reference position on subsequent cycles. As will become apparent from description which follows, prism 50, when necessary, may be moved to clear a moving machine element when an output signal which actuates the shear is developed in the circuitry of the invention. The apparatus to move prism 50 has not been illustrated since it is conventional in nature and forms no part of my invention. However, one mechanism successfully employed for this purpose consisted solely of a solenoid actuated bell-crank to which prism 50 was cemented. Other mechanisms may be employed as well depending largely on the type of machine tool with which my inventive apparatus is associated.

FIGURES 5B through 5F illustrate the output waveforms of detector 24 for the various positions of the registration mark 22 illustrated at the correspondingly lettered sub-figure of FIGURE 4. In FIGURE 5, time increases from left to right. FIGURE 5A illustrates the time varying position of oscillating arm 26. Because of the very low inertia of arm 26, wavetrain 5A may also be considered to be identical or nearly identical with the AC reference voltage supplied to the system circuitry at terminal 58. Provisions for reconciling the slight difference therebetween are described below.

When registration mark 22 is displaced from the center 60 of the scanning area 32 to a position to the left and near one edge thereof as shown in FIGURE 4B, the output signal of detector 24 is shown in FIGURE 5B. The flat top or straight line portion of the wavetrain occurs when the detector scans the image of the uniform background 62 of material 20 adjacent mark 22. The negative going loop occurs once each cycle as the detector cyclically moves into and out of the image of the registration mark. Note that in this and the following examples, the reference position with respect to which registration mark 22 is positioned, has been assumed to be the center 60 of the active scanning area 32. Other reference positions, offset as desired from the position of this example, could be employed. However, normally the reference position is located at the center of the active scan area.

If the registration mark is then positioned nearer to the center 60 of active scanning area 32 as shown in FIGURE 4C, detector output is as shown in FIGURE 5C. There again the straight line portion of the wavetrain occurs when the detector does not "see" the registration mark and only "sees" the uniform background area 62 of material 20. The double negative going loop is generated as the detector cyclically scans back and forth through the image of the registration mark 22. Note that when compared with FIGURE 5B the duration of the scan through the image of the mark 22 has increased relative to the duration of the scan of the uniform background area 62 and that the two scan durations have almost become equal.

When the registration mark 22 is positioned at the center 60 of the active scanning area as illustrated in FIGURE 4D, the output wavetrain of detector 24 is as illustrated in FIGURE 5D. Two complete cycles each consisting of a negative going loop and a straight line portion appear in the output wavetrain for each scan cycle with identical waveforms generated on each side of the scan cycle. The output wavetrain is, for this position of the mark, composed only of even harmonics of the frequency of displacement of oscillating arm 26 with no fundamental component. Thus, the output wavetrain comprises a signal whose component frequencies, other than the constant term, are all even harmonics of the frequency of FIGURE 5A.

If the registration mark 22 is moved to the right of center 60 of scanning area 32 as shown in FIGURE 4E, the output wavetrain of detector 24 is as illustrated in FIGURE 5E. A move of the work further to the right as shown in FIGURE 4F results in output wavetrain of FIGURE 5F. By inspection of FIGURES 5B through 5F, it can be seen that as the registration mark 22 is displaced one way or the other from the center 60 of scanning area 32, the fundamental component in the output wavetrain appears. Further, as the displacement of the mark from center increases, the fundamental component increases in amplitude with its phase determined by the direction of displacement from center 60. Displacement of the mark one way produces a fundamental component in phase with the wavetrain of FIGURE 5A and displacement in the other direction produces a fundamental component 180° out of phase with that wavetrain. Thus, the characteristics of the fundamental contained in the output wavetrain are exactly those required to provide a servo control signal indicative of the position of registration mark 22.

The means by which I convert these characteristics of the detector signal are illustrated schematically in FIGURE 1.

The output signal from detector 24 is amplified in signal amplifier 64. Signal amplifier 64 is a cascaded grounded emitter transistor amplifier whose final stages are operated saturated to maintain a comparatively uniform servo loop gain over large ranges of signal level from detector 24. The output signals of amplifier 64 corresponding to its input signals 5B, 5C, 5D, 5E and 5F are also illustrated in FIGURE 5 as signals H, I, J, K and L respectively. The manner of achieving these characteristics of signal amplifier 64 and the reason therefore are explained in greater detail in connection with FIGURE 7.

The amplified output of signal amplifier 64 is processed by low-Q tuned filter 66 which passes the fundamental frequency contained therein and slightly reduces the amplitude of any higher harmonics present. The filtered signal is further amplified in push-pull cascaded emitter follower transistor power amplifier 68 before being applied to the control phase winding 72 of two-phase servo motor 70. The 90 degree phase shift required between the winding 72 and the fixed phase winding 74 of servo-motor 70 is provided by phase shift network 76. The fixed phase relationship required between the output of detector 24 and the AC reference voltage applied to winding 74, is maintained by connecting both arm drive coil 30 and phase shifter 76 to the same AC reference voltage source at terminal 58.

The servo loop back to registration mark 22 is closed by providing a mechanical link between the output shaft of servo motor 70 and material 20. This link is schematically indicated as 78 in FIGURE 1. The link 78 may be, for example, a driving roller, a driven gage bar or pin against which the material is held or a conveyor on which the material rests.

Those features of my invention which have been described above accomplish the positioning of the registration mark that is required prior to any subsequent operation such as shearing, punching, embossing, notching, printing, etc. However, no matter how the positioning is accomplished, for the machine to be completely automatic there exists as a requirement for the machine that it be able to detect that the positioning is satisfactorily completed before self initiation of the machine operation. An advantageous feature of my invention is an ability to analyze registration mark positioning in accord with the degree of accuracy required by a particular application and provide an auxiliary control signal when the positioning has been satisfactorily completed. This analysis of registration mark positioning is accomplished by logic circuitry shown in block schematic form at 80 in FIGURE 1. There, the circuit elements indicated as synchronous fundamental demodulator 82, averaging filter 84 and null detector 86 function in combination to logically determine when positioning of the registration mark 22 has been completed to the accuracy requirements established by positive and negative voltage reference levels applied as an input to null detector 86 at the terminals generally indicated at 87 in the drawing.

Synchronous fundamental demodulator 82 is connected either to the signal output of power amplifier 68 as shown in the drawing or, alternately, in embodiments having no servo system, to the output of filter 66. Demodulator 82 may advantageously be a conventional AC type chopper and desirably is driven by the source of AC reference voltage connected at terminal 58. The chopping action of demodulator 82 results in the wavetrains at the demodulators input being multipled by a time varying factor illustrated at G in FIGURE 5 of the drawing. This multiplication converts any fundamental component in the output signal of power amplifier 68 to a pulsating voltage having a DC offset whose amplitude and polarity are determined by the phase and amplitude of the fundamental component in the output signal.

The output of the fundamental demodulator 82 is fed to an averaging filter 84 which smoothes this pulsating voltage to remove most of the AC component. The resulting output of filter 84 is a signal consisting primarily of the DC component of the fundamental demodulators output. This DC signal then goes to null detector 86 for comparison with the positive and negative voltage reference levels supplied at terminal 87. When the output DC level from filter 84 falls between the positive and negative voltage reference levels supplied at terminal 87, an output signal results. This output signal is indicative of the condition where the registration mark 22 is properly positioned but, this same condition would be indicated if no mark were being scanned or, very low contrast existed between the material background and the mark. These sources of erroneous signal are overcome by features embodied in the apparatus of the invention.

To determine that the registration mark 22 is indeed located properly and that the system is not merely looking at a low contrast target area with a consequent low level output signal from detector 24, I employ a signal presence detector 290 comprising residual rectifier 90, averaging filter 92 and level detector 94 in combination with logic clamp 88. Logic clamp 88 receives signals from both level detector 94 and null detector 86 and releases to initiate an output signal when both signals are present.

Residual rectifier 90 rectifies all AC components in the control signal at the output of either power amplifier 68 or filter 66 depending on whether or not a servo output is associated with the system. The output of rectifier 90 is thus a pulsating DC voltage whose average amplitude is proportional to the average value of the AC voltage in the control signal. This pulsating voltage is passed to averaging filter 92 which converts the pulsating DC signal to a smooth DC level. The smooth DC level at the output of filter 92 is in turn passed to a level detector 94 which allows an output signal to pass whenever the output of filter 92 is greater than some reference level inserted at its input terminal 96. Since whenever the registration mark 22 is within the field of view of detector 24 there will be an output from filter 92, the reference level need only be set high enough to insure that this condition will be met. The output of level detector 94 is applied to logic clamp 88 along with the output signal from null detector 86.

The combined action of logic circuitry 80 and signal presence detector 290 can be illustrated by examples. When the signal voltage to null detector 86 is in the range between the plus and minus voltage reference level supplied at its terminal 87 and at the same time the signal voltage to level detector 94 is greater than the reference level supplied at its terminal 96, logic clamp 88 is released and subsequent circuit elements generate an output auxiliary control signal. If either of the conditions above set forth is not satisfied, logic clamp 88 is not released and the auxiliary control signal will not be initiated. Examples of how these conditions are fulfilled may assist in understanding the operation of the circuitry.

When the automatic registration system begins its operation and no registration mark is within the active sensing area 32, no signal will be generated by detector 24. Thus, no signal will be applied to fundamental demodulator 82 and residual rectifier 90. This condition results in zero voltages being applied to both null detector 86 and level detector 94. Since the voltage to level detector 94 is below the reference level supplied at its terminal 96, there will be no output from level detector 94 and logic clamp 88 will not be released.

Another instance when the logic clamp 88 should not be released occurs when the registration mark 22 is in the active scanning area 32 but has not yet been moved to the correct centered position. In this instance, a large fundamental component will be present in the detector signal. This signal is amplified, filtered and applied to the servo control motor 70 causing the motor to rotate and move the material to properly center the registration mark. This control signal for the motor 70 is also applied to fundamental demodulator 82 and residual rectifier 90. The output from averaging filter 84 will be a large positive or negative voltage until the registration mark 22 has been driven close to the proper center position 60. At that time the fundamental component in the signal will drop to a low value, the control motor 70 will slow down or stop, and the output of fundamental demodulator 82 will drop to a low value. During this entire sequence of events the output of residual rectifier 90 remains at a high level, either from the fundamental component in the signal or, from the harmonic components which form the major amplitude components near the null. Initially, logic clamp 88 could not release because the voltage to null detector 86 was either too positive or too negative. Then when the registration mark is moved close enough to the null or centered position, this distance being determined by the reference levels set into the null detector 86, logic clamp 88 will be released.

It is an advantageous feature of my invention that there is provided certain circuit elements which insure against premature machine actuation such as might result if there is an overshoot or undershoot in the material positioning servo system or if any other action moves the registration mark outside the limits set by the reference levels applied at terminal 88. These circuit elements are comprised of time delay 98 and control relay 100. Release of logic clamp 88 initiates a time delay predetermined by circuit elements within time delay 98. After the predetermined time delay effected by the circuitry of 98 has been accomplished, control relay 100 is actuated. Control relay 100 provides as an output an auxiliary control signal which may be used to initiate the next operation of shearing, punching, embossing, notching, printing, etc. This combined action of time delay 98 and control relay 100 insures that the registration mark has been maintained in a proper centered position for a certain minimum time before initiating an operation on material 20. If, however, the registration mark were for some reason to be repositioned outside the acceptable limits before the time delay of the circuitry of 98 had run its course, logic clamp 88 would be reactivated immediately resetting the time delay and thus preventing an output control signal.

A preferred embodiment executing the block diagram of FIGURE 1 is shown in schematic form in FIGURE 7. There, arm drive coil 30 is excited from the AC reference source applied at terminal 58 through step-down transformer 102, amplitude adjusting resistor 104 and DPDT reversing switch 106. The signal generated by detector 24 is applied to the base of emitter follower transistor 108 through capacitor 110. Resistor 112 provides a small amount of reverse bias to detector 24 under low light level condition. Resistor 114 establishes the DC operating level for transistors 108 and 116. Resistor 118 establishes the operating current for transistor 108.

The signal from transistor 108's emitter is direct coupled to the base of emitter follower transistor 116. Resistor 120 establishes the operating current of transistor 116. The signal from transistor 116 is condenser coupled from that transistor's emitter to the base of grounded emitter transistor 122 through capacitor 124. The operating current of transistor 122 is established by load resistor 126 and feedback resistor 128. The signal is passed from the collector of transistor 122 by direct coupling to the base of grounded emitter transistor 130. Under the condition of high signal level from the detector 24 which occurs with all materials having good contrast between the background and the registration mark 22, saturation of the signal amplifier can occur at as early a stage as transistor 130. Advantage is taken of this saturation as explained below.

To insure symmetrical saturation of the signal amplifier, the operating current of transistor 130 is controlled by resistor 132 and the operating current of transistor 134 is controlled by resistor 136. The signal is direct coupled from the collector of transistor 130 and load resistor 138 to the base of grounded emitter transistor 134. Capacitors 140 and 142 serve as emitter bypass capacitors. From the collector of transistor 134 the signal is coupled by transformer 144 to the bases of Class B push-pull cascaded emiter follower power amplifier 68's input transistors 146 and 146'. Transformer 144 is tuned by capacitor 148 to the reference frequency supplied at terminal 58. Transformer 144 as tuned by capacitor 148 serves as low-Q tuned filter circuit 66 to slightly reduce the amplitude of the second and higher harmonics relative to the fundamental component in the signal. Under conditions of saturation at null, when the signal is primarily second and higher harmonics, this tuning aids in maintaining the power amplifier's gain constant relative to the small fundamental component in the signal. Reduction of the second harmonic by a factor between 2 and 3 accomplishes the desired results. Transformer 144 also converts the single ended signal from transistor 134 to the push-pull signal required by power amplifier 68.

Since transistors 146, 150 and 152 of power amplifier 68 function in exactly the same manner as transistors 146', 150', and 152' other than for a 180° phase difference in the signal inputs to the same, only the circuitry of transistors 146, 150 and 152 will be described in detail. The signal from the base of transistor 146 is direct coupled through diode 152 to the base of emitter follower transistor 150. Resistor 156 provides the load resistor for transistor 146 and the leakage current path for power transistor 150. By further connecting resistor 156 to the output of power amplifier transistor 150, it is possible to advantageously increase the input impedance of transistor 146. Diode 154 reduces the no signal DC voltage applied to transistor 150 and thus to transistor 152 by approximately 0.5 volt. This reduction, in turn, reduces the standby current drawn by transistor 152 and thus reduces the low signal level dissipation in the collector of that transistor.

The signal is direct coupled from the emitter of transistor 150 to the base of power transistor 152. Resistor 158 serves as a load resistor for transistor 150 and the leakage current path for power transistor 152. Resistor 158 is also connected to the output of the power amplifier to increase the input impedance of transistor 150 and thus increase the input impedance of transistor 146. The signal is direct coupled from the emitter of output transistor 152 to one side of the center tapped control winding 72 of two phase servo motor 70.

Condenser 160 and diode 162 function in combination as phase shifter 76 to introduce a leading phase angle to the voltage applied to the fixed phase 74 of servo motor 70. Simultaneously condenser 160 and diode 162 introduce a DC current into the motor winding. As will be apparent to those versed in the electrical arts, the leading phase angle is required to provide a 90° phase angle between the fundamental signal applied to the control winding 72 and the fixed phase winding 74. The DC current in the fixed phase provides velocity damping for the complete servo loop by introducing braking torque at the motor shaft proportional to motor speed.

As described above, the servo loop is closed by a mechanical link 78 between the motor 70's shaft and the material 20 bearing the registration mark 22 which is being scanned by detector 24. In normal AC servo loop systems without velocity feedback, satisfactory performance of the system in terms of accuracy and stability with loop gain changes of 10 to 1 is exceptional. Here however, the fundamental signal component in the time varying illumination falling on oscillating detector 24 with the range of material and registration mark combinations normally encountered, can change by a factor of more than 1000 to 1. No normal servo loop can perform satisfactorily over this extensive range without some type of gain adjustment. It is an advantageous feature of this invention that servo loop gain is held constant by novel means within a factor of approximately 5 by operating the final stage or stages of the signal amplifier saturated. In addition, for extremely high signal levels the logarithmic voltage characteristics of the silicon photovoltaic detector preferably employed can advantageously be used to reduce the conversion gain of the detector in terms of the output voltage and thus prevent saturation of the signal amplifier prior to transistor 130.

How amplifier saturation assists in maintaining servo loop gain constant, may be better understood by reference to FIGURE 5. There, wavetrains H, I, J, K and L represent the saturated current flow into the base of transistor 134 due to signal output wavetrains from detector 24 as illusrated in FIGURE 5 at B, C, D, E and F respectively. As long as the signal level from detector 24 is high enough to cause saturation, essentially no change occurs in the amplitude or proportions of the saturated signals applied to the tuned primary of transformer 144. Inspection of the saturated waveforms of FIGURE 5 shows that the fundamental component in each corresponds quite well with the fundamental component in the unsaturated signals; that is, the ratio of the fundamental component to the total signal in the linear case, is approximately the same as the ratio of fundamental component to full saturated square wave in the saturated case. The ratio of fundamental component to total signal in the linear case was shown above to be primarily a function of the displacement of the registration mark from center position. Thus, we have a signal applied to transformer 144 in which the fundamental component amplitude is primarily a function of the displacement of the registration mark from center and is independent of the absolute signal level generated by the particular combination of material and registration mark. Such a signal is exactly the type which is required for constant servo loop gain.

In considering the manner in which constant servo loop gain is achieved, one thing that must be emphasized is that this constant servo loop gain can only be achieved in the above described manner if the harmonics remain in the output signal at the place in the amplifier where the saturation occurs. If the harmonics were filtered out prior to the saturated stage of the amplifier, effective amplifier gain would remain constant and full fundamental output obtained for a very small signal input under all conditions.

With the constant servo loop gain control of the invention, the only system change that must be made to accommodate differences in registration marks, occurs when the relative brightness of mark to background reverses. In some combinations of background and registration mark, the registration mark is brighter than the background. In all other combinations of background and registration mark, the registration mark is darker than the background. The position of polarity reversing switch 106 is selected depending on whether the background is lighter or darker than the registration mark.

The signal used to analyze the positioning accuracy of the registration mark is obtained from the push-pull output of power amplifier 68. This signal is applied to the primary of isolating transformer 164 to remove the small DC voltage present at the output of the power amplifier. The center tapped voltage from the secondary of transformer 164 is applied to the contacts of chopper relay 166 which advantageously is of the type employing mercury wetted contacts. Relay 166 together with isolating transformer 164 functions as synchronous fundamental demodulator 82 and operates at the AC reference frequency supplied at terminal 58. The phase of the relay contact closure is adjusted to be in phase with the fundamental component in the signal from power amplifier 68 by proper choice of resistors 168 and 170 and capacitor 172. The synchronous demodulated signal appearing at the armature 174 of relay 166 is filtered by averaging filter 84 comprised of resistor 176 and capacitor 178. If the filtered signal is more positive than the plus reference level set in the null detector 86 by resistor 180, then transistor 182 is turned on by the signal passed through diode 184. Transistor 182 then draws current through resistor 186 which results in the base of logic clamp transistor 188 being held at the small negative potential set by diode 190 through divider resistors 192 and 194.

If the filtered signal is more negative than the reference level set into the null detector 86 by resistor 196, then transistor 198 is turned on by the signal passed through emitter follower transistor 200 and diode 202. This action draws current through resistor 186 and holds the base of logic clamp transistor 188 at the same small negative potential set by diode 190 through divider resistors 192 and 194. Resistor 181 establishes the operating level of transistor 200 when diode 202 is not conducting and holds transistor 198 cutoff. Resistor 183 is the common load resistor for emitter follower transistor 200 and grounded base level detector transistor 198. Resistor 185 holds level detector transistor 182 cutoff when diode 184 is not conducting. Resistor 204 is a protective resistor.

The center-tapped secondary of transformer 164 also is connected to full wave rectifier diodes 206 and 208. Resistor 210 insures that the average value of the full wave rectified signal voltage is applied to averaging filter 92 comprised of resistors 212 and 214 and capacitors 216 and 218. Variable resistor 220 in combination with resistor 212 establishes the reference level above which level detector transistor 222 will be cut off. Diode 224 prevents reverse breakdown between base and emitter of transistor 222. Diodes 224 and 226 together prevent a large negative voltage buildup on capacitors 216 and 218 thus insuring that as soon as the signal voltage drops below the reference level, transistor 222 will be turned on immediately. When transistor 222 is "on," it draws current through resistor 186 and holds the base of transistor 188 at a small negative potential due to the action of resistors 192 and 194 and diode 190.

The emitter of logic clamp transistor 188 is maintained at approximately ground potential if any one of the three level detector transistors 182, 198 or 222 is turned on. When all three level detector transistors are turned off, indicating that a proper registration mark is in correct position, the base of transistor 188 rises in potential to almost 40 volts. The emitter of transistor 188 also rises in potential drawing current through time delay resistor 228 and starting the time delay cycle as time delay capacitor 230 is charged. When the voltage on time delay capacitor 230 reaches approximately 6 volts, control relay transistor 232 is turned on through diode 234 actuating control relay 236. Diode 234 and resistor 238 are used to prevent reverse voltage breakdown between base and emitter of transistor 232. Diode 240 provides a path for fast discharge of time delay capacitor 230 through load resistor 242 at any time logic clamp 188 is pulled down in potential by transistors 182, 198 or 222.

In certain applications of the automatic registration system, a large scanning area is required for initial detection of the registration mark but a small scanning area is required for best accuracy in final positioning of that mark. It is a feature of my inventive apparatus that it has provisions for detecting the sensing area requirement and controlling the scan amplitude in accord therewith. An embodiment of my invention which incorporates this feature is shown in FIGURE 6 of the drawing. There, the size of the active scanning area is changed by changing the scanning amplitude by inserting resistor 244 in series with the arm drive coil 30. With the resistor inserted in series, the scan amplitude is reduced. Selection of large or small scan amplitude is made by time delay 246, scan relay 248 and resistor 244 which are added to the circuitry previously described in connection with FIGURE 1. The operation of this additional circuitry can best be understood by reference to the following example.

With a registration mark in other than proper position or without a registration mark in the scanning area, logic clamp 88 is not released and scan relay 248 is not actuated. Under this condition resistor 244 is shorted by a normally closed contact in relay 248 and a large scan amplitude results. When a registration mark is detected and moved near to the center position using the large scan amplitude, logic clamp 88 releases when all level detectors have been satisfied. This release of logic clamp 88 immediately actuates scan relay 248 and sets time delay 246. Actuation of scan relay 248 places resistor 244 in series with the arm drive coil 30 and reduces the scan amplitude. Depending on the exact position of the registration mark, this may or may not change the voltage to null detector 86 sufficiently to exceed one of the reference levels thereto. If the reference level is exceeded, time delay 246 holds in scan relay 248 long enough to allow the registration mark to be accurately positioned while still using the low amplitude scan signal. If, at the end of the time delay period established by time delay 246, the reference levels established at the input to null detector 86 have not again been satisfied, scan relay 248 is released and resistor 244 again shorted increasing scan amplitude.

The foregoing description has been in terms of single channel operation; that is, operation with a single detector head. However, in many instances it is desirable to align two or more registration marks with their respective reference positions before initiating a machine operation on the material. Circuitry to accomplish such multi-channel operation is illustrated in FIGURE 8 for a two channel system. There, the output of each detector is assumed to be individually processed by circuitry essentially the same as that in FIGURE 1, and terminating in a null detector 86 and a level detector 94 (neither shown). There is also provided a coincidence detector 250 which releases only when the input from both level detectors 94 and both null detectors 86 are all simultaneously present. Release of coincidence detector 250 in turn initiates time delay 98' and subsequently control relay 100'. Both time delay 98' and control relay 100' are identical with time delay 98 and control relay 100 previously described in connection with FIGURE 1.

My invention has been described in detail with particular reference to preferred embodiments thereof. However, it will be understood that variations and modifications can be effected within the spirit and scope of the invention as described hereinabove and as defined in the appended claims.

I claim:
1. Electro-optical sensing apparatus for determining the position of registration indicia relative thereto and for positioning material bearing said indicia, comprising
one or more electro-optical sensing heads, each cyclically scanning an area particularly located with respect to said head, each of said sensing heads having output signals representative of the position of a single registration indicia within said scanned area,
a symmetrically saturating servo amplifier means connected to each of said sensing heads for converting the output signals thereof to reversible phase servo control signals having amplitude characteristics proportionally related to the position of said registration indicia,
reversible servo means connected to each symmetrically saturating servo amplifier means and proportionally responsive to said reversible phase servo control signals for positioning said registration indicia relative to said sensing heads, and
a position analyzing circuit connected to each of said symmetrically saturating servo amplifier means and adapted to analyze said reversible phase servo control signals at the output thereof simultaneously with said indicia positioning by said servo means and to initiate an auxiliary control signal when said servo control signal output of said symmetrically saturating servo amplifier means has characteristics which reveal that servo positioning of said registration indicia has been satisfactorily completed.

2. Electro-optical sensing apparatus for determining the position of registration indicia relative thereto and for positioning material bearing said indicia, comprising a source of AC electrical energy, one of more electro-optical sensing heads, each electrically actuated by said source to cyclically scan at a fixed amplitude an area particularly located with respect to said head, said sensing heads having output signals representative of the position of said registration indicia relative thereto, a signal amplifier connected to each of said sensing heads for amplifying said output signals thereof, a filter connected to receive the amplified output signals of each of said signal amplifiers, said filter being tuned to reduce harmonics of said cyclical scanning frequency present in said amplified output signals, a power amplifier for each of said filter circuits connected to the output thereof for converting the amplified and filtered output signal to a servo control signal, servo means connected to each of said power amplifiers, said servo means comprising a two phase servo control motor having a control winding and a fixed phase winding, said control winding being connected to receive said servo control signal, a phase shifting network connected between said AC source and said fixed phase winding for adjusting the phase of said AC source relative to said cyclical scanning frequency, a position analyzing circuit connected to each of said power amplifiers and adapted to compare the output thereof to preselected electrical reference signals and to initiate an auxiliary control signal when said comparison results in a particular relationship between said power amplifiers output and said electrical reference signals, and a scan amplitude control circuit connected to said position analyzing circuit and responsive to the presence of an auxiliary control signal to decrease the fixed amplitude of cyclical scanning of said electro-optical sensing heads for a predetermined minimum time.

3. Electro-optical sensing apparatus for determining the position of registration indicia relative thereto and for positioning material bearing said indicia, comprising a source of AC electrical energy, one or more electro-optical sensing heads, each electrically actuated by said source to cyclically scan at a fixed amplitude an area particularly located with respect to said head, said sensing heads having output signals representative of the position of said registration indicia relative thereto, a signal amplifier connected to each of said sensing heads for amplifying the output signals thereof, a filter circuit connected to the output of each of said signal amplifiers for filtering the output thereof to reduce the amplitude of harmonics of said cyclical scanning frequency present therein relative to the amplitude of the fundamental signal component of said cyclical scanning frequency, a power amplifier connected to each of said filter circuits for converting the amplified and filtered output signals thereof to a servo control signal, servo means connected to each of said power amplifiers, said servo means comprising a two phase servo control motor having a control winding and a fixed phase winding, said control winding being connected to receive said servo control signal, a phase shifting network connected between said fixed phase winding and said AC source for adjusting the phase of the electrical energy from said AC source impressed on said fixed phase winding relative to said cyclical scanning frequency, a position analyzing circuit connected to each of said power amplifiers and adapted to compare the output thereof to preselected voltage reference levels and to initiate an auxiliary control signal a predetermined time after said comparison results in a particular relationship between said power amplifiers output signal and said preselected voltage reference levels, and a scan amplitude control circuit comprising a scanning time delay circuit and relay means, said scanning time delay circuit being connected to said position analyzing circuit and responsive to an output thereof to initiate a scan output signal of predetermined minimum duration, said relay means being conected to said scanning time delay circuit and responsive to the scan output signal thereof to effect circuit changes in the input to said sensing heads for reducing the scan amplitude thereof.

4. Electro-optical sensing apparatus for determining the position of registration indicia relative thereto and for positioning material bearing said indicia, comprising a source of AC electrical energy, one or more electro-optical sensing heads, each electrically actuated by energy from said source to cyclically scan at a fixed frequency and amplitude an area particularly located with respect to said head, each of said sensing heads having output signals representative of the position of a single registration indicia within said scanned aera, a constant servo loop gain signal processing circuit connected to each of said sensing heads for converting the output signals thereof to reversible phase servo control signals having amplitude characteristics proportionally related to the position of said registration indicia, each of said signal processing circuits consisting of a multi-stage signal amplifier connected to one of said sensing heads for amplifying the output signals thereof, said signal amplifier being adapted to operate with its final stages saturated, a filter circuit connected to the output of said signal amplifier and tuned to reduce harmonics of said fixed cyclical scanning frequency present in the amplified output signals, and a power amplifier connected to said filter circuit for converting the amplified and filtered output signals thereof to said reversible phase servo control signals having amplitude characteristics proportionally related to the position of said registration indicia, servo means connected to each of said power amplifiers, said servo means comprising a two phase servo control motor having a control winding and a fixed phase winding, said control winding being connected to receive said reversible phase servo control signal, a phase shifting network connected between each of said fixed phase windings and said AC source for adjusting the phase of the electrical signal impressed on said fixed phase winding relative to said cyclical scanning frequency, and a position analyzing circuit connected to each of said power amplifiers and adapted to continuously compare said reversible phase servo control signal output thereof to preselected fixed voltage reference levels simultaneously with said indicia positioning by said servo means and to initiate an auxiliary control signal a predetermined time after said comparison results in a particular relationship between said power amplifiers output signal and said preselected voltage reference levels.

15

5. Electro-optical sensing apparatus in accordance with claim 4 wherein each of said sensing heads further comprises a wieldable optical means comprising two parallel reflecting surfaces for physically offsetting said scanned area a fixed distance relative to said sensing head.

6. Electro-optical sensing apparatus in accordance with claim 5 wherein said wieldable optical means comprises a rhomboid prism.

7. An automatic registration system for determining the position of registration indicia relative thereto and for positioning material bearing said indicia, comprising
one or more electro-optical sensing heads, each cyclically scanning at a fixed frequency a scan area particularly located with respect to said head, each of said sensing heads having output signals representative of the position of a registration indicia within said scanned area,
a constant servo loop gain output signal processing circuit connected to each of said sensing heads for converting the output signals thereof to reversible phase servo control signals having amplitude characteristics proportionally related to the position of said registration indicia, each of said output signal processing circuits consisting of
    a multi-stage signal amplifier connected to one of said sensing heads for amplifying the output signals thereof, said signal amplifier being adapted to operate with its final stages saturated,
    a filter circuit connected to said signal amplifier and tuned to reduce harmonics of said fixed cyclical scanning frequency present in the amplified output signals, and
    a power amplifier connected to said filter circuit for converting the amplified and filtered output signals thereof to said reversible phase servo control signals having amplitude characteristics proportionally related to the position of said registration indicia, and
servo means connected to each of said power amplifiers and proportionally responsive to said reversible phase servo control signals for positioning said material bearing said registration indicia relative to said sensing heads,
    said servo means comprising a two phase servo control motor.

8. An automatic registration system for determining the position of registration indicia relative thereto and for positioning material bearing said indicia, comprising
one or more electro-optical sensing heads, each cyclically scanning at a fixed frequency a scanned area particularly located with respect to said head, each of said sensing heads having output signals representative of a registration indicia within said scanned area,
a constant servo loop gain output signal processing circuit connected to each of said sensing heads for converting the output signals thereof to reversible phase servo control signals having amplitude characteristics proportionally related to the position of said registration indicia, each of said output signal processing circuits consisting of
    a multi-stage signal amplifier connected to one of said sensing heads for amplifying the output signals thereof, said signal amplifier being adapted to operate with its final stages saturated, an L-C filter connected to said signal amplifier and tuned to reduce the harmonics of said cyclical scanning frequency present in the amplified output signals, and
    a push-pull power amplifier connected to said filter circuit for converting the amplified and filtered output signals thereof to said reversible phase servo control signal having amplitude characteristics proportionally related to the position of said registration indicia, and

16 servo motor means connected to each of said constant servo loop gain output signal processing circuits and proportionally responsive to said reversible phase servo control signals for positioning said registration indicia relative to said sensing heads,
    said servo motor means comprising a two phase servo control motor having its control winding connected to receive said reversible phase servo control signal and having its fixed phase winding excited at a frequency related to said scanning frequency.

9. An electro-optical sensing head comprising
scanning means including an aperture mask cyclically oscillating in a scanning plane and radiation detector means responsive to radiation passing through said aperture mask for producing an electrical signal representative of said passed radiation,
a radiation light source arranged to illuminate a sensing area,
an objective lens focusing the image of said sensing area in said scanning plane, and
a rhomboid prism movably disposed in the optical path between said light source and said objective lens to produce a precise fixed offset in said sensing areas location relative to said source and said lens.

10. In a proportional rate closed loop servo system stable over a large range of sensing transducer gain and having a single sensing transducer providing output signals which contain a fundamental frequency and harmonics thereof and which are indicative of the condition to be measured, a servo amplifier for amplifying the output signals of said sensing transducer to provide a reversible phase output signal having amplitude characteristics proportionally related to said sensing transducers output signals and, servo means proportionally responsive to said amplifiers output to modify the physical condition being measured, the improvement in said servo system comprising
a servo amplifier having symmetrical saturation characteristics whereby the servo loop gain is maintained relatively constant over said large range of sensing transducer gain.

11. In a servo amplifier of the type useful in a closed loop proportional servo system stable over a large range of sensing transducer gain and having a single sensing transducer providing output signals which contain a fundamental frequency and harmonics thereof and which are indicative of the condition to be measured, a multi-stage servo amplifier for amplifying the output signals of said sensing transducer to provide a reversible phase output signal having amplitude characteristics, proportionally related to said sensing transducers output signals and, servo means proportionally responsive to said amplifiers output to modify the physical condition being measured, the improvement comprising
means for continuously maintaining saturation in one or more stages of said servo amplifier, and
means for reducing the amplitude of second and higher harmonics present in the output signal of said servo amplifier.

12. In a servo amplifier of the type useful in a closed loop proportional servo system stable over a large range of sensing transducer gain and having a single sensing transducer providing output signals which contain a fundamental frequency and harmonics thereof and which are indicative of the condition to be measured, a multi-stage servo amplifier for amplifying the output signals of said sensing transducer to provide a reversible phase output signal having amplitude characteristics proportionally related to said sensing transducers output signals and, servo means proportionally responsive to said amplifiers output to modify the physical condition being measured, the improvement comprising
means for continuously maintaining saturation in one or more stages of said servo amplifier, and means for reducing the amplitude of second and higher harmonics present in the output signal of said servo amplifier by a factor of between 2 and 3.

13. Electro-optical sensing apparatus for determining the position of registration indicia relative thereto and for positioning material bearing said indicia, comprising
at least two electro-optical sensing heads, each cyclically scanning an area particularly located with respect to said head, said sensing heads each having output signals representative of the position of a single registration indicia within its scanned area,
a symmetrically saturating servo amplifier means connected to each of said sensing heads for converting the output signal thereof to reversible phase servo control signals having amplitude characteristics proportionally related to the position of said registration indicia,
reversible servo means connected to each symmetrically saturating servo amplifier means and proportionally responsive to said reversible phase servo control signals for positioning said registration indicia relative to said sensing heads,
a position analyzing circuit connected to each of said symmetrically saturating servo amplifier means and adapted to analyze said reversible phase servo control signals at the output thereof simultaneously with said indicia positioning by said servo means and to initiate an auxiliary output signal when said servo control signal output of said symmetrically saturating servo amplifier means has characteristics which reveal that servo positioning of said registration indicia has been satisfactorily completed, and
a single coincidence circuit connected at its input to the output of each of said position analyzing circuits and adapted to initiate an output auxiliary control signal when output signals are present from all of said position analyzing circuits.

14. An automatic registration system for determining the position of registration indicia relative thereto, comprising
one or more electro-optical sensing heads, each cyclically scanning an area particularly located with respect to said head, each of said sensing heads having output signals representative of the position of a registration indicia within said scanned area,
a constant servo loop gain output signal processing circuit connected to each of said sensing heads for converting the output signals thereof to reversible phase servo control signals having amplitude characteristics proportionally related to the position of said registration indicia, each of said signal processing circuits consisting of
a multi-stage signal amplifier connected to one of said sensing heads for amplifying the output signals thereof, said signal amplifier being adapted to operate with its final stages saturated,
a filter circuit connected to the output of said signal amplifier and tuned to reduce the amplitude of harmonics of said cyclical scanning frequency present in the amplified output signals to generate said reversible phase servo control signals having amplitude characteristics proportionally related to the position of said registration indicia, and
a continuously operative position analyzing circuit connected to each of said filter circuits and adapted to compare the output thereof to preselected fixed voltage reference levels and to initiate an auxiliary control signal when said comparison reveals a particular relationship therebetween.

15. A closed loop servo system stable over a large range of sensing transducer gain, comprising
a single cyclically scanning transducer providing electrical output signals indicative of the condition to be measured, said output signals containing a fundamental frequency and harmonics thereof,
a constant servo loop gain signal processing circuit connected to said sensing transducer for converting the output signals thereof to reversible phase servo control signals having amplitude characteristics proportionally related to the measured condition, said signal processing circuit comprising
a multi-stage servo amplifier connected to said sensing transducer for amplifying the output signals thereof, said servo amplifier being adapted to operate with certain intermediate stages saturated,
reversible servo means proportionally responsive to said servo amplifiers output for modifying the condition being measured in accord therewith.

16. A closed loop servo system stable over a large range of sensing transducer gain, comprising
a single cyclically scanning sensing transducer operable over a large range of gain to provide electrical output signals indicative of the condition being measured, said output signals containing a fundamental frequency and harmonics thereof wherein the ratio of fundamental component to total signals is indicative of the measured condition,
a constant servo loop gain signal processing circuit connected to said sensing transducer for converting the output signals thereof to reversible phase servo control signals having amplitude characteristics proportionally related to the measured condition, said signal processing circuit consisting of
a multi-stage signal amplifier connected to said sensing transducer for amplifying the output signals thereof, said signal amplifier being adapted to operate with its final stages saturated,
filter means connected to said signal amplifier for reducing the amplitude of second and higher harmonics present in the output of said signal amplifier, and
a power amplifier connected to said filter means for converting the output signals thereof to said reversible phase servo control signals having amplitude characteristics proportionally related to the measured condition, and
servo actuation means connected to said power amplifier means for modifying the condition being measured in accord with said reversible phase servo control signals.

References Cited

UNITED STATES PATENTS

| | | | |
|---|---|---|---|
| 2,489,305 | 11/1949 | McLennan | 250—202 |
| 2,518,325 | 8/1950 | Hurley | 250—219 |
| 2,674,917 | 4/1954 | Summerhayes | 88—14 |
| 2,840,371 | 6/1958 | Frommer | 250—219 |
| 2,892,948 | 6/1959 | Frantz | 250—202 |
| 2,965,762 | 12/1960 | Turck | 250—203 |
| 2,994,783 | 8/1961 | Looscher | 250—219 |
| 3,209,152 | 9/1965 | Brouwer | 250—202 |

RALPH G. NILSON, *Primary Examiner.*

WALTER STOLWEIN, *Examiner.*

J. D. WALL, *Assistant Examiner.*